United States Patent [19]
Smith

[11] 3,774,461
[45] Nov. 27, 1973

[54] ADJUSTABLE DRIVING MECHANISM FOR VARIABLE OUTPUT PUMPS

[75] Inventor: Edward M. Smith, Mansfield, Ohio

[73] Assignee: The Gorman-Rupp Company, Mansfield, Ohio

[22] Filed: May 11, 1972

[21] Appl. No.: 252,356

[52] U.S. Cl. .................................. 74/49, 74/600
[51] Int. Cl. ............................................ F16h 21/18
[58] Field of Search .................. 74/45, 47, 48, 49, 74/50, 600; 417/472

[56] References Cited
UNITED STATES PATENTS
2,259,587  10/1941  Rush .................................. 74/600
2,509,475   5/1950  Brosemer ............................ 74/45
2,699,119   1/1955  Healey ................................ 74/45

*Primary Examiner*—Charles J. Myhre
*Assistant Examiner*—Wesley S. Ratliff, Jr.
*Attorney*—Hamilton, Renner & Kenner

[57] ABSTRACT

Mechanism for adjusting the stroke length of a variable positive displacement pump at any time without stopping the operation of the pump. A drive shaft mounted on a frame drives a crank, and a bearing on the end of the crank rides in an elongated slot in a driving arm attached to a connecting rod which imparts reciprocating movement to the pump. The outer end of the driving arm is pivoted to a control arm which is rotatably adjustably mounted on the frame to change the orientation of the elongated slot with consequent change in the stroke of the connecting rod.

6 Claims, 9 Drawing Figures

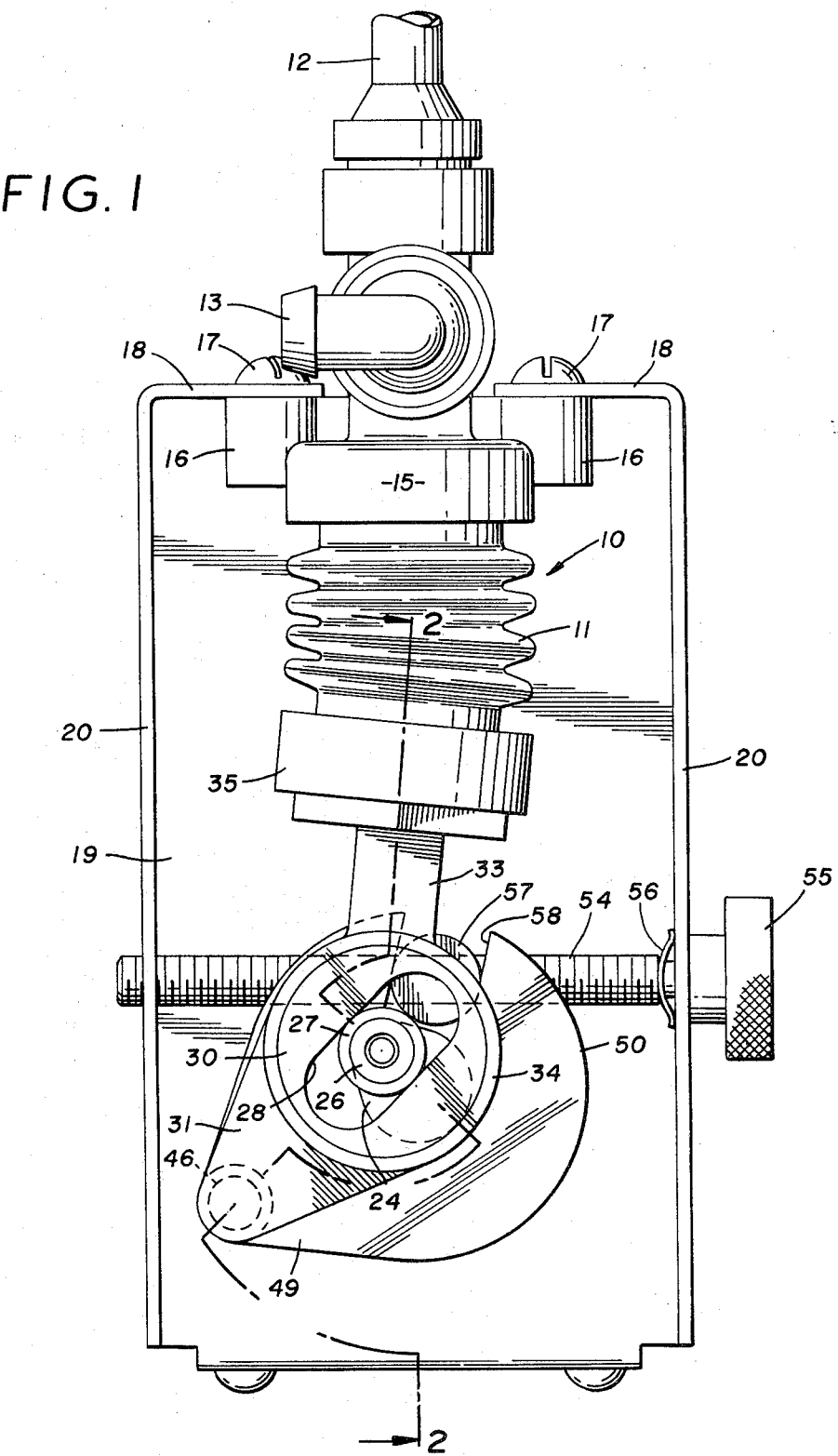

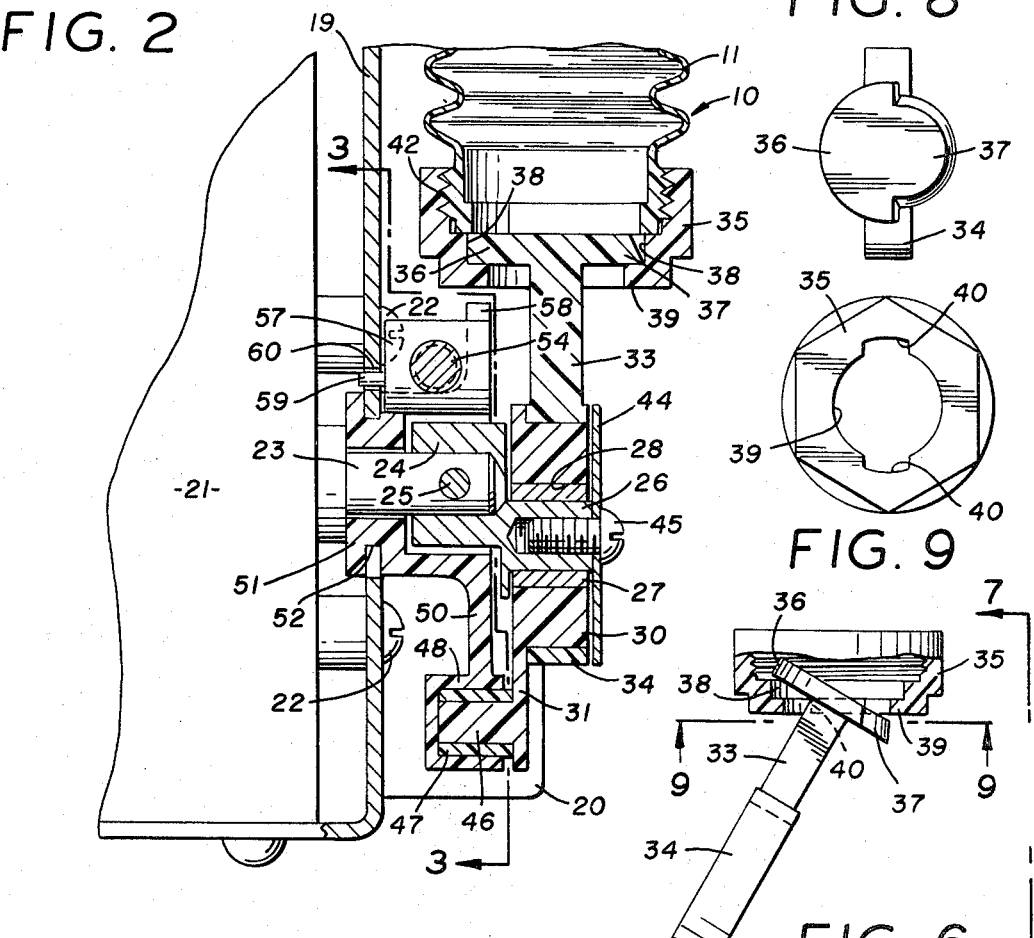
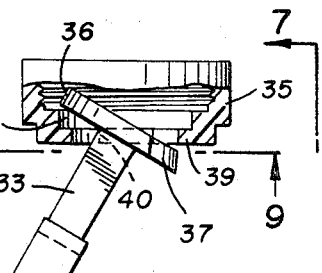
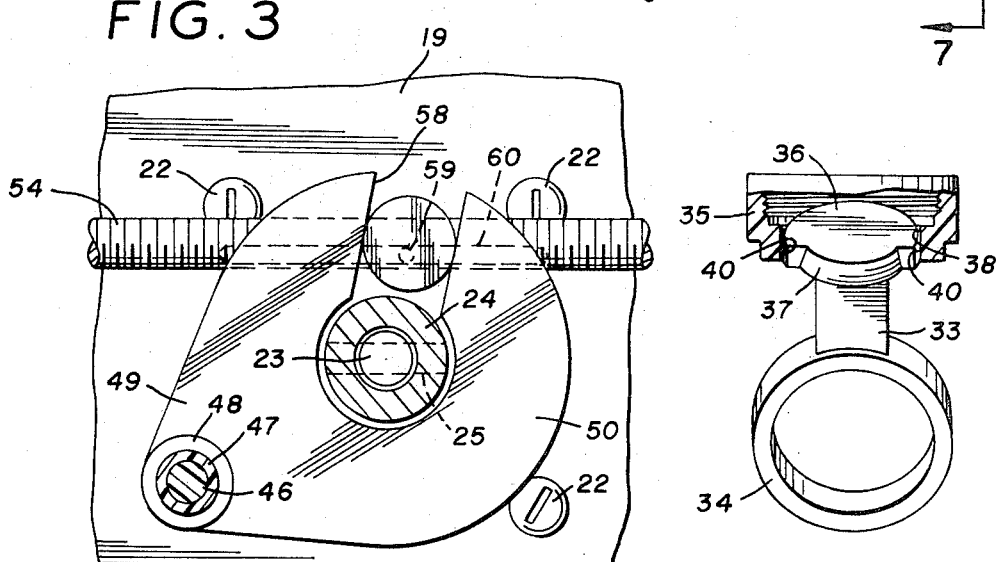

ADJUSTABLE DRIVING MECHANISM FOR VARIABLE OUTPUT PUMPS

BACKGROUND OF THE INVENTION

In my prior U.S. Pat. No. 3,529,908, there is disclosed a variable output positive displacement bellows pump having a drive shaft driving a crank operatively connected to the pump by a reciprocating connecting rod. Two embodiments of mechanisms are disclosed for adjusting the stroke length of the connecting rod. In one embodiment the connecting rod has an adjusting nut thereon and a coil spring is positioned between the nut and the end of the pump in such a way that moving the nut toward the pump bellows provides a certain amount of lost motion, that is, a movement of the connecting rod which is not directly reflected by movement of the pump bellows, resulting in a variation of the effective stroke of the bellows.

In the other embodiment disclosed in U.S. Pat. No. 3,529,908, the eccentricity of the crank is adjusted by providing a crank arm with a circular recess, and a bolt extending across the recess is connected to the end of the drive shaft for radial adjustment within the recess. Thus, the throw of the crank arm is adjusted by turning the bolt.

In both of these stroke adjusting mechanisms, it is necessary for the driving mechanism and hence the pump to be stationary and at rest in order to change the adjustment. However, it is often highly desirable and important to be able to adjust the stroke length without stopping the operation of the pump.

SUMMARY OF THE INVENTION

It is therefore an object of the present invention to provide novel and improved driving mechanism for manually adjusting the stroke length of a variable positive displacement pump at any time during operation of the pump.

Another object is to provide improved adjustable driving mechanism which is easily applied to a driven crank and connecting rod construction for reciprocating the pump without requiring additional space or supports.

A further object is to provide improved adjustable driving mechanism which is simple, compact and inexpensive to manufacture and install.

Another object is to provide improved adjustable driving mechanism which is self-locking in any position of adjustment.

These and other objects are accomplished by the improvements comprising the present invention, a preferred embodiment of which is shown in the accompanying drawings and described in detail in the following specification. Various modifications and changes in details of construction are comprehended within the scope of the appended claims.

BRIEF DESCRIPTION OF THE DRAWINGS

FIG. 1 is an elevational view of the improved adjustable driving mechanism applied to a bellows positive displacement pump, showing the stroke adjustment mechanism in an intermediate position.

FIG. 2 is a partial sectional view on line 2—2 of FIG. 1.

FIG. 3 is a partial sectional view on line 3—3 of FIG. 2.

FIG. 6 is a partial elevational view, partly broken away and in section, showing the detachable connection between the closed end of the bellows pump and the connecting rod.

FIG. 7 is a similar view at 90° to FIG. 6.

FIG. 8 is an end view of the connecting rod.

FIG. 9 is an end view of the pump on line 9—9 of FIG. 6 into which the end of the connecting rod fits.

DESCRIPTION OF A PREFERRED EMBODIMENT

Figure 4:
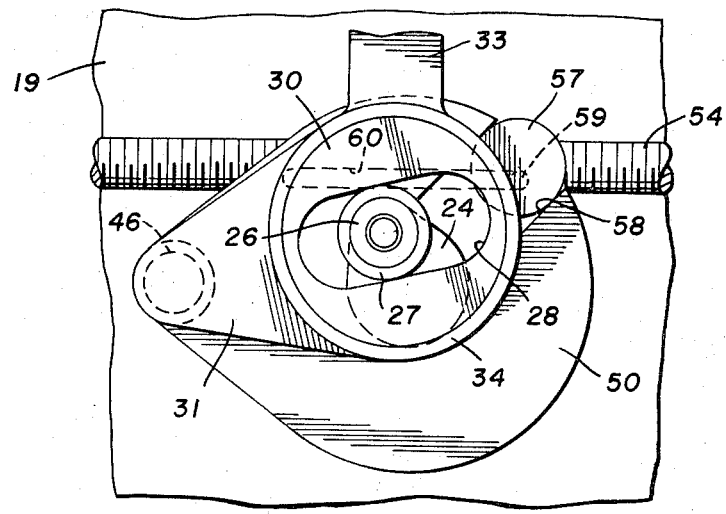
FIG. 4 is a fragmentary elevational view similar to FIG. 1, showing the stroke adjustment mechanism in position to produce a substantially maximum stroke length.

Referring to FIGS. 1 and 2, the improved adjustable driving mechanism is shown applied to a positive displacement bellows pump indicated as a whole at 10 similar to the pump shown in my prior U.S. Pat. No. 3,529,908. The pump is preferably formed of suitable non-toxic plastic material and has convolutions 11 which are flexible and durable over long periods of time. An outlet port connected to the top of the pump is indicated at 12 and a suction or inlet port is indicated at 13. Suitable outlet and inlet valves (not shown) are provided in ports 12 and 13, respectively.

The end closure fitting 15 connected to the top of bellows pump 10 has mounting ears 16 which are attached by screws 17 to angular flanges 18 on the upper end of a frame plate 19. Side flanges 20 are provided on the frame plate. As shown in FIG. 2, a gear box 21 is mounted to the frame plate 19 by scews 22. A drive shaft 23 projects from the gear box through the frame plate 19 and a crank 24 is fixed on the end of the drive shaft by a pin 25.

The crank 24 has an eccentrically offset outer arm 26 on which a bearing sleeve 27 is journaled. The sleeve 27 is movably received in an elongated slot 28 provided in a drive arm. The slot 28 is located within a cylindrical boss 30 on the drive arm which has a radially extending arm portion 31.

The connecting rod 33 has a cylindrical ring 34 rotatably mounted on the boss 30 which is integral with the rod or suitably attached thereto. At its outer end the connecting rod is detachably connected to a coupling nut 35 on the bottom end of the bellows pump. Inasmuch as the ring 34 is larger in diameter than the opening in the coupling nut 35, the connection between the rod and the coupling nut is preferably made in the manner shown in FIGS. 6 – 9.

The connecting rod has a plate flange at its upper end with a larger substantially semi-circular portion 36 on one side and a smaller curved portion 37 on the other side. The portion 36 has a radius adapted to fit within the cylindrical groove 38 in the nut 35 and rest on the peripheral flange 39 in the manner shown in FIG. 2. The portion 37 is inwardly upwardly beveled and its lower face has a radius sufficient to rest on the peripheral flange 39. As shown in FIG. 9, the flange 39 has diametrically opposite notches 40 giving the flange a keyhole shape, and the diameter of the opening across the notches is slightly greater than the diameter of portion 36 of the plate flange.

Thus, the plate flange on the connecting rod can be "buttoned" through the opening provided by the opposed notches, as illustrated in FIGS. 6 and 7, and then swung to the horizontal position resting on peripheral flange 39, as shown in FIG. 2, with the lower face of portion 37 overlapping flange 39. The nut is then screwed tightly onto the threaded neck 42 of the bellows to hold the plate flange in abutment therewith.

A cover plate, shown at 44 in FIG. 2, is attached to the crank arm 26 by a screw 45, and serves to hold the drive arm on the crank arm and the connecting rod ring 34 on the drive arm.

The outer end of drive arm 31 has a cylindrical pivot stud 46 formed thereon which has a sleeve bearing 47 thereon. The bearing 47 is mounted for pivotal movement on the frame by journaling the bearing in a socket 48 on the radially outer portion 49 of a control member or plate 50. As seen in FIG. 2, the control plate has a hub 51 which is journaled in an opening 52 in the frame plate.

Means for rotatably adjusting the control plate in the frame plate to rotatably adjust the location of the pivot stud 46 around the drive shaft preferably comprises a screw 54 extending through the side flanges 20 of the frame and having a knurled head 55 on one end for manual turning. A spring washer 56 is interposed between the side flange 20 adjacent to the head and a shoulder on the screw to hold the screw in position. the The screw is threaded through a cylindrical nut 57 slidably received in a radial slot 58 in the portion 50 of the control arm. Thus, turning the screw will move the nut linearly thereof, the movement of the nut in the slot compensating for the arcuate movement of control member 50 about the drive shaft as a center. As shown in FIGS. 2 and 3, the nut 57 has a pin 59 projecting therefrom which is slidably received in a linear slot 60 in the frame plate, to prevent the nut from rotating when the adjusting screw is turned.

In the operation of the improved driving mechanism, assuming the control member 50 to be in the intermediate position of adjustment shown in FIGS. 1 and 3, as the crank 24 is rotated by the drive shaft 23, the drive arm 31 will be oscillated by the rotation of the crank bearing 27 within the slot 28, but part of the throw of the crank in the direction of the connecting rod will be absorbed by the movement of the bearing 27 linearly of the slot. The remaining throw of the crank will cause a reciprocating stroke of the connecting rod 33 to compress and extend the bellows.

If the adjusting screw is turned to move the nut to the right to the position of FIG. 4, the pivot 46 will be rotated clockwise to orient the slot to the position where maximum throw of the crank is transmitted through the connecting rod to the pump. In this position the pin 59 on the nut is at the extreme right end of the slot 60 in the frame plate.

Figure 5:
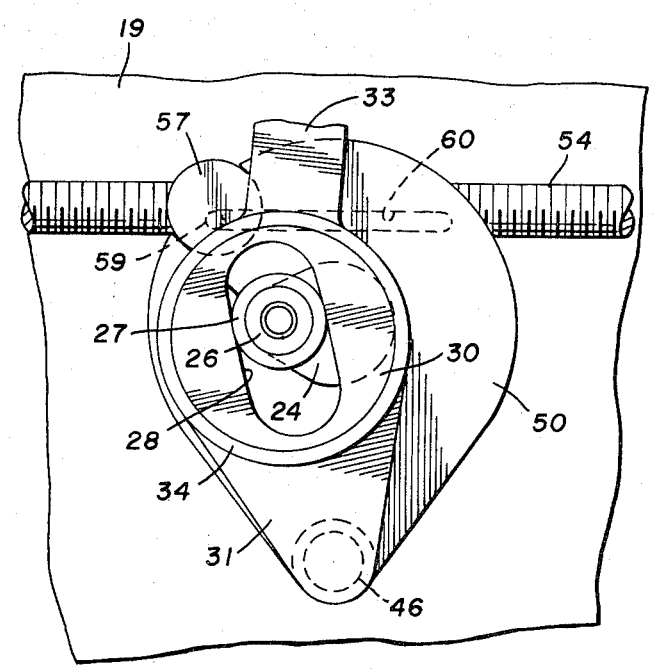
FIG. 5 is a similar view showing the stroke adjustment mechanism in position to produce a minimum stroke length.

If the adjusting screw 54 is turned in the opposite direction to rotate the pivot 46 counterclockwise to orient the slot 28 to the position of FIG. 5, there will be substantially no throw of the crank transmitted through the connecting rod to the pump, as substantially all of the throw in the direction of the connecting rod will be linearly within the slot 28.

Thus, the adjustment by the screw 54 can vary the throw transmitted to the pump by the connecting rod from substantially zero to full stroke, and since the screw is mounted on the frame the adjustment can be made at any time without stopping operation of the driving mechanism. In all positions of adjustment the screw 54 is self-locking.

The improved adjustable driving mechanism is simple and compact, and is easily embodied in a crank and connecting rod construction without requiring additional space or supporting means.

I claim:

1. In driving mechanism for a positive displacement pump including a frame, a drive shaft rotatable in said frame, a crank arm on said drive shaft and a connecting rod operatively connecting the crank to the pump, mechanism for adjusting the stroke length of the connecting rod comprising a driving arm rotatably attached to the connecting rod and having an elongated slot movably receiving the end of said crank, means mounting the outer end of said driving arm for pivotal movement on the frame, and means for rotatably adjusting said pivot location around said drive shaft as a center to change the orientation of said slot with respect to said connecting rod.

2. In driving mechanism as in claim 1, in which the means mounting the outer end of the driving arm on the frame is a control member rotatably adjustably mounted on the frame around the drive shaft as a center.

3. In driving mechanism as in claim 2, in which means is provided on the frame for manually adjusting said control member.

4. In driving mechanism as in claim 3, in which the manual adjusting means is a screw threaded through a nut on said control member.

5. In driving mechanism as in claim 4, in which the nut is slidably mounted in a radial slot in said control member.

6. In driving mechanism as in claim 5, in which a pin on said nut is slidable in a linear slot in the frame to prevent the nut from turning.

* * * * *